United States Patent
Zhou et al.

(10) Patent No.: US 11,403,040 B2
(45) Date of Patent: Aug. 2, 2022

(54) FLASH MEMORY DEVICE THAT SIMULATES OPERATIONS OF EEPROM AND DATA PROGRAMMING AND READING METHOD THEREOF

(71) Applicant: REALTEK SEMICONDUCTOR CORPORATION, Hsinchu (TW)

(72) Inventors: Hao Zhou, Suzhou (CN); Hong Chang, Suzhou (CN); Xiao-Lin Luo, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 44 days.

(21) Appl. No.: 17/120,389

(22) Filed: Dec. 14, 2020

(65) Prior Publication Data

US 2021/0216247 A1    Jul. 15, 2021

(30) Foreign Application Priority Data

Jan. 14, 2020 (CN) .......................... 202010034731.3

(51) Int. Cl.
*G06F 12/00* (2006.01)
*G06F 3/06* (2006.01)
*G06F 11/10* (2006.01)

(52) U.S. Cl.
CPC .......... *G06F 3/0659* (2013.01); *G06F 3/0619* (2013.01); *G06F 3/0629* (2013.01); *G06F 3/0653* (2013.01); *G06F 3/0679* (2013.01); *G06F 11/1068* (2013.01)

(58) Field of Classification Search
CPC .... G06F 3/0659; G06F 3/0619; G06F 3/0629; G06F 3/0653; G06F 3/0679; G06F 11/1068; G06F 3/0616; G06F 3/0641; G06F 3/0608; G06F 11/1004; G06F 3/0614; G06F 3/0638; G06F 3/0647; G06F 3/0658
USPC ........................................................ 711/154
See application file for complete search history.

(56) References Cited

U.S. PATENT DOCUMENTS

| 5,031,174 | A | * | 7/1991 | Natsume | H04L 45/742 370/452 |
| 10,492,207 | B2 | * | 11/2019 | Ludwig | H04L 47/2433 |
| 10,545,697 | B1 | * | 1/2020 | Tsirkin | G06F 3/0604 |
| 2016/0197852 | A1 | * | 7/2016 | Hutchison | G06F 3/0656 370/392 |

FOREIGN PATENT DOCUMENTS

| EP | 3043522 A1 | * | 7/2016 | ........... H04L 45/245 |
| GB | 2505225 | * | 2/2014 | |

* cited by examiner

*Primary Examiner* — Mardochee Chery
(74) *Attorney, Agent, or Firm* — WPAT, PC

(57) ABSTRACT

A data programming method includes the following operations: assigning a first identity code to initial data according to a data type of the initial data; packing the first identity code, the initial data, and a check code to a new data packet; determining whether a first storage space in a flash memory stores a first data packet being the same as the new data packet; and if the first storage space does not store the first data packet, programming the new data packet to the first storage space in a first address sequence.

20 Claims, 8 Drawing Sheets

FLASH MEMORY DEVICE THAT SIMULATES OPERATIONS OF EEPROM AND DATA PROGRAMMING AND READING METHOD THEREOF

BACKGROUND OF THE INVENTION

1. Field of the Invention

The present disclosure relates to a memory device. More particularly, the present disclosure relates to a flash memory device that simulates an electrically-erasable programmable read-only memory and a data programming/reading method thereof.

2. Description of Related Art

In current approaches, electrically-erasable programmable read-only memory (EEPROM) and a flash memory are common memories. In practical applications, the EEPROM supports to update data at a specified address, while the flash memory cannot instantly update the data at the specified address. Moreover, the service life of the EEPROM is commonly longer than that of the flash memory, and the cost of the EEPROM is commonly higher than that of the flash memory. In response to different advantages/disadvantages and different data updating mechanisms of these two memories, most electronic products will employ both of these two memories.

SUMMARY OF THE INVENTION

In some embodiments, a data programming method includes the following operations: assigning a first identity code to initial data according to a data type of the initial data; packing the first identity code, the initial data, and a check code to a new data packet; determining whether a first storage space in a flash memory stores a first data packet being the same as the new data packet; and if the first storage space does not store the first data packet, programming the new data packet to the first storage space in a first address sequence.

In some embodiments, a data reading method includes the following operations: selecting a first storage space from a plurality of storage spaces in a flash memory according to a plurality of counter data stored in the flash memory, in which plurality of counter data are respectively stored in the plurality of storage spaces; reading a plurality of data packets in the first storage space according to a first identity code; and if at least one data packet in the plurality of data packets has the first identity code, outputting one data packet of the at least one data packet that is read first as final data.

In some embodiments, a memory device includes a flash memory and a controller circuit. The flash memory includes a first storage space. The controller circuit is configured to: assign a first identity code to initial data according to a data type of the initial data; pack the first identity code, the initial data, and a check code to a new data packet; determine whether a first storage space in a flash memory stores a first data packet being the same as the new data packet; and if the first storage space does not store the first data packet, program the new data packet to the first storage space in a first address sequence.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
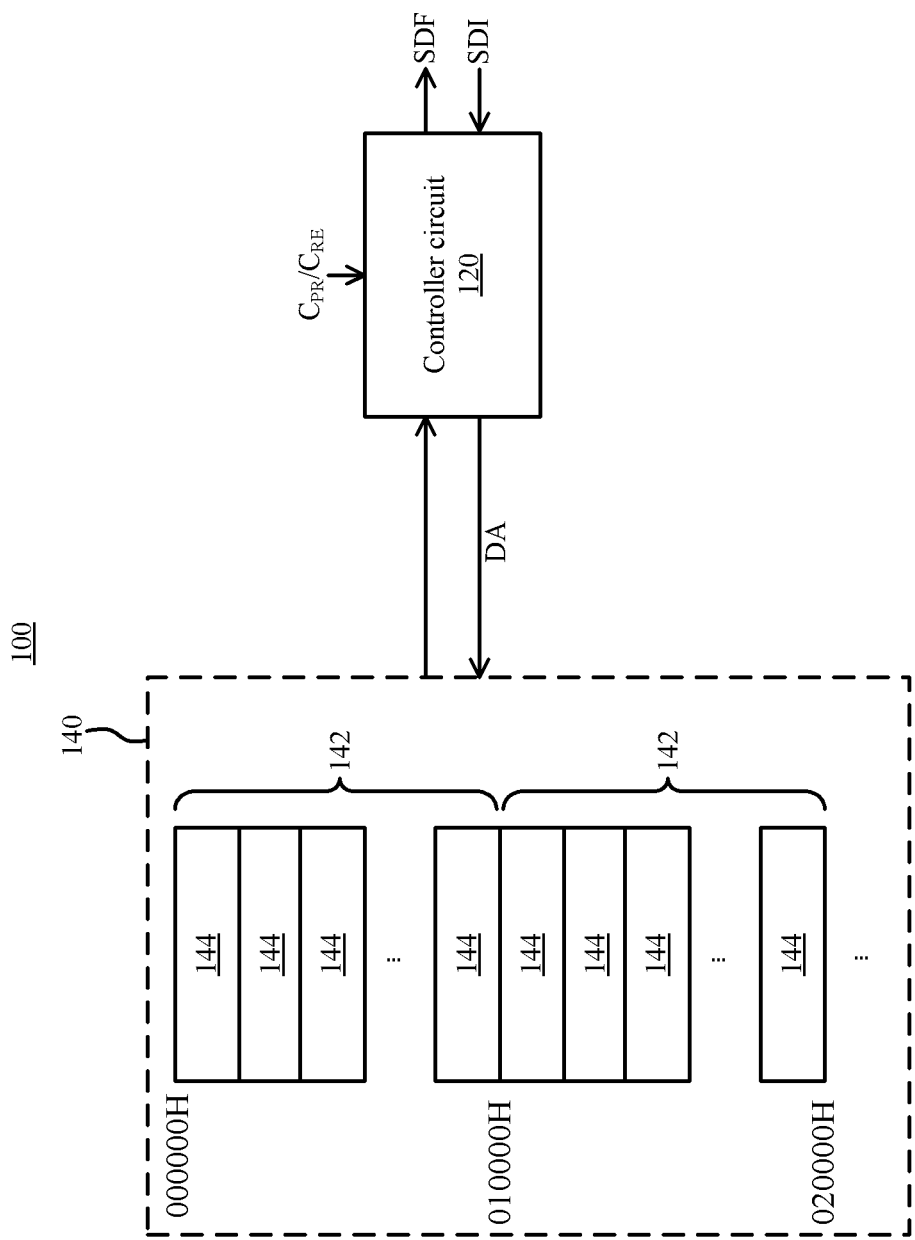
FIG. 1 is a schematic diagram of a memory device according to some embodiments of the present disclosure.

FIG. 1 is a schematic diagram of a memory device 100 according to some embodiments of the present disclosure. The memory device 100 includes a controller circuit 120 and a flash memory 140. The controller circuit 120 is coupled to the flash memory 140, in order to control data access of the flash memory 140. In response to a programming command $C_{PR}$, the controller circuit 120 packs initial data SDI into a new data packet DA, and programs the new data packet DA to the flash memory 140. In response to a read command $C_{RE}$, the controller circuit 120 reads a corresponding data packet from the flash memory 140, and outputs the same as final data SDF. Operations about data access are described later. In some embodiments, the controller circuit 120 may be implemented with a digital processor circuit or a microcontroller circuit having a computational ability.

In some embodiments, based on the control of the controller circuit 120, the flash memory 140 is able to operate as an electrically-erasable programmable read-only memory (EEPROM). As a result, in practical applications, the memory device 100 is able to replace the EEPROM, in order to have longer service life and lower manufacturing cost.

The flash memory 140 includes memory banks 142, and each memory bank 142 includes sectors 144. For example, a capacity of each memory bank 142 may be 65536 bytes, and a capacity of each sector 144 may be 4096 bytes. A first memory bank 142 corresponds to addresses ranging from 000000H to 010000H, and includes 16 sectors 144. A second memory bank 142 corresponds to addresses ranging from 010000H to 020000H, and includes 16 sectors 144. The values given above are for illustrative purposes, and the present disclosure is not limited thereto.

In some embodiments, before programming data to the flash memory 140, the controller circuit 120 erases a storage space of the flash memory 140. In some embodiments, the storage space may be one sector 144. In some embodiments, the storage space may be one memory bank 142. For ease of description, the following embodiments are described with reference to examples in which the storage space is one sector 144, but the present disclosure is not limited thereto.

Figure 2:
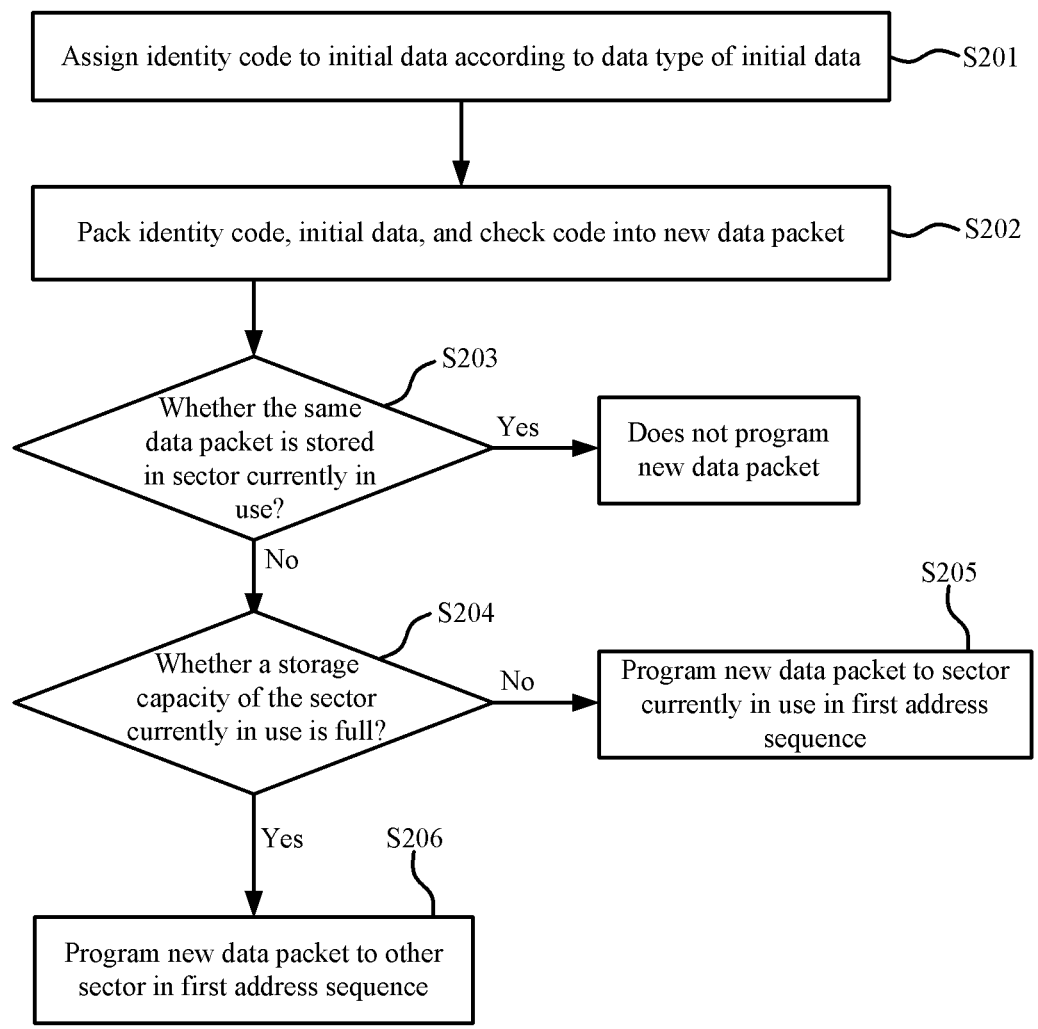
FIG. 2 is a flow chart of a data programming method according to some embodiments of the present disclosure.

FIG. 2 is a flow chart of a data programming method 200 according to some embodiments of the present disclosure. In some embodiments, the data programming method 200 may be performed by the controller circuit 120 in FIG. 1. In operation S201, an identity code is assigned to initial data according to a data type of the initial data. In operation S202, the identity code, the initial data, and a check code are packed into a new data packet.

Figure 3A:
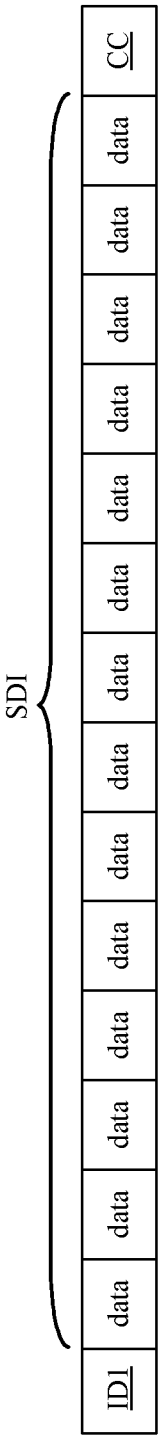
FIGS. 3A to 3D are schematic diagrams respectively illustrating operations in FIG. 2 according to some embodiments of the present disclosure.

Reference is made to FIG. 3A. FIG. 3A is a schematic diagram of operation S202 in FIG. 2 according to some embodiments of the present disclosure. The controller circuit 120 assigns an identity code ID1 to the initial data SDI according to a data type of the initial data SDI. For example, if the initial data SDI is a first configuration parameter of a first application program (e.g., a parameter for setting contrast of a display panel), the controller circuit 120 assigns the identity code ID1 to the initial data SDI. Alternatively, if the initial data SDI is a second configuration parameter of the first application (e.g., a parameter for controlling brightness of the display panel), the controller circuit 120 assigns an identity code ID2 to the initial data SDI. If the initial data SDI is a first configuration parameter of a second application, the controller circuit 120 assigns an identity code ID3 to the initial data SDI. With this analogy, if the same configuration parameter is updated (i.e., new initial data SDI is received), the controller circuit 120 is able to assign the same identity code to the new initial data SDI.

The controller circuit 120 further performs data verification on the initial data SDI, in order to generate a corresponding check code CC. In some embodiments, the data verification may be (but not limited to) a cyclic redundancy check (CRC) operation. The check code CC may be utilized to verify whether the initial data SDI is correctly programmed to the flash memory 140.

If the capacity of each sector 144 is 4096 bytes and a data length of the each data packet DA is 16 bytes, each sector 144 is able to store 256 data packets DA. The controller circuit 120 assigns the identity code ID1 to a first byte, and sequentially assigns data values of the initial data SDI to a second to a fifteenth bytes and assigns the check code CC to a sixteenth byte. As a result, when the initial data SDI is received, the controller circuit 120 performs the above operations to pack the identity code ID1, the initial data SDI, and the check code CC into the new data packet DA.

With continued reference to FIG. 2, in operation S203, whether the same data packet is stored in the sector currently in use is determined. If the same data packet is stored in the sector, the new data packet is not programmed. Alternatively, if the same data packet is not stored in the sector, operation S204 is performed.

Figure 3B:
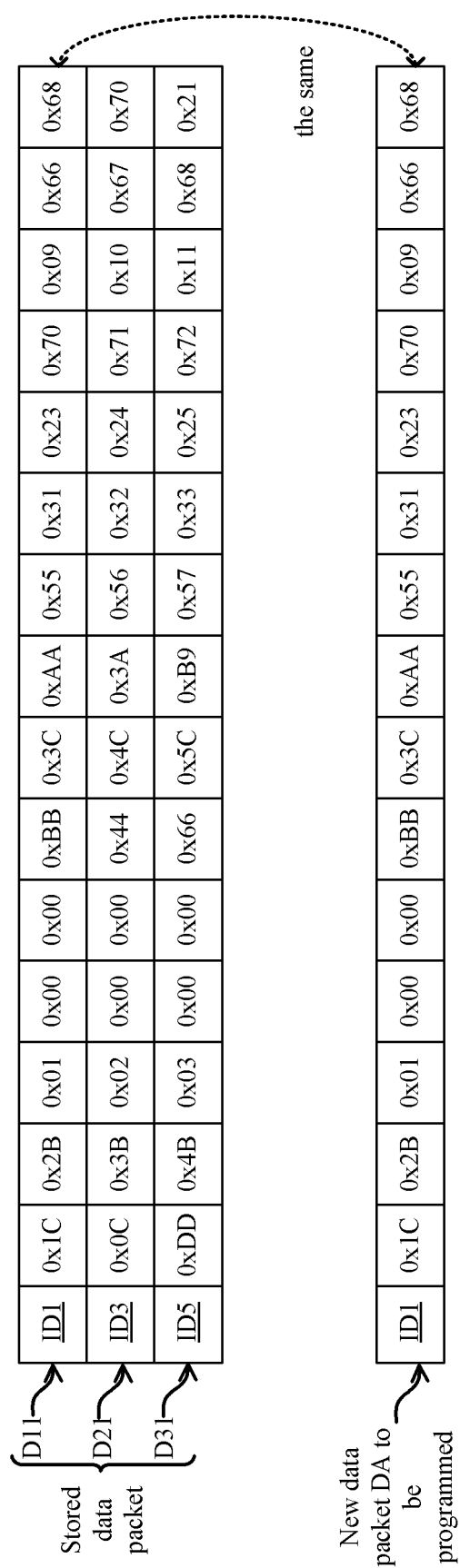

Reference is made to FIG. 3B. FIG. 3B is a schematic diagram of operation S203 in FIG. 2 according to some embodiments of the present disclosure. The sector 144 stores data packets D11, D21, and D31, and the new data packet DA is a new data packet DA to be programmed to the sector 144. The controller circuit 120 reads the data packets D11, D21, and D31, and compares the identity code ID1 of the new data packet DA with the identity codes of each data packet D11, D21, and D31 stored in the sector 144, in order to select at least one data packet from the data packets D11, D21, and D31, in which the identity code of the selected at least one data packet is the same as the identity code ID1 of the new data packet DA. Afterwards, the controller circuit 120 determines whether data of the selected data packet is the same as the new data packet, in order to determine whether the same data packet is stored in the sector 144. In the above comparison, if the data packets D11, D21, and D31 do not include the corresponding identity code, the sector 144 does not store the same data packet.

For example, the controller circuit 120 compares the identity code ID1 with a first byte (i.e., the identity code) of each data packet D11, D21, and D31. As an identity code ID5 of the data packet D31 is not the same as the identity code ID1, the controller circuit 120 then compares the identity code ID1 with an identity code ID3 of the data packet D21. As the identity code ID3 of the data packet D21 is not the same as the identity code ID1, the controller circuit 120 then compares the identity code ID1 with the identity code ID1 of the data packet D11. As the identity code ID1 of the data packet D11 is the same as the identity code ID of the new data packet DA, the controller circuit 120 compares second to sixteenth bytes of the data packet D11 with those of the new data packet DA respectively. If all bytes are the same, as shown in FIG. 3B, the controller circuit 120 determines that the data packet D11 is the same as the new data packet DA. Under this condition, the controller circuit 120 determines that the sector 144 stores the data packet D11 being the same as the new data packet DA, and thus does not program the new data packet DA to the sector 144. Alternatively, if there is one byte is different, the controller circuit 120 determines that the data packet D11 is different from the new data packet DA. Under this condition, the controller circuit 120 determines that the sector 144 does not store a data packet being the same as the new data packet DA, and thus programs the new data packet DA to the sectors 144. With the configuration of identity codes, the flash memory 140 is able to update data of the data packets having the same identity code. As a result, the controller circuit 120 is able to utilize the flash memory 140 to perform the above operations, in order to simulate operations of EEPROM updating data at a specified address.

With continued reference to FIG. 2, in operation S204, whether a storage capacity of the sector currently in use is full is determined. If the storage capacity is not full, operation S205 is performed. Alternatively, if the storage capacity is full, operation S206 is performed. In operation S205, the new data packet is programmed to the sector currently in use in a first address sequence. In operation S206, the new data packet is programmed to other sector in the first address sequence.

Figure 3C:
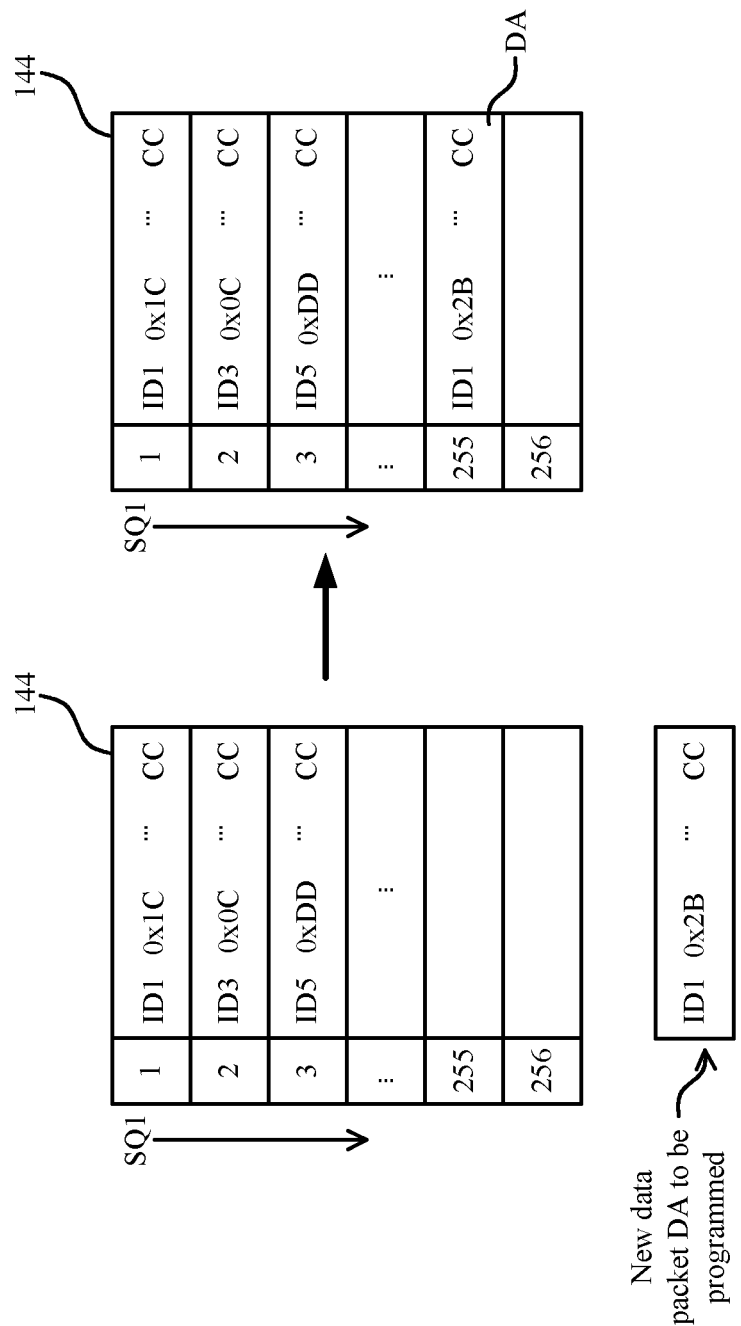

Reference is made to FIG. 3C. FIG. 3C is a schematic diagram of operation S205 in FIG. 2 according to some embodiments of the present disclosure. If the storage capacity of the sector 144 is not full, the controller circuit 120 programs the new data packet DA to the sectors 144 in an address sequence SQ1. The address sequence SQ1 is starting from a front address (1) to a back address (256).

Figure 3D:
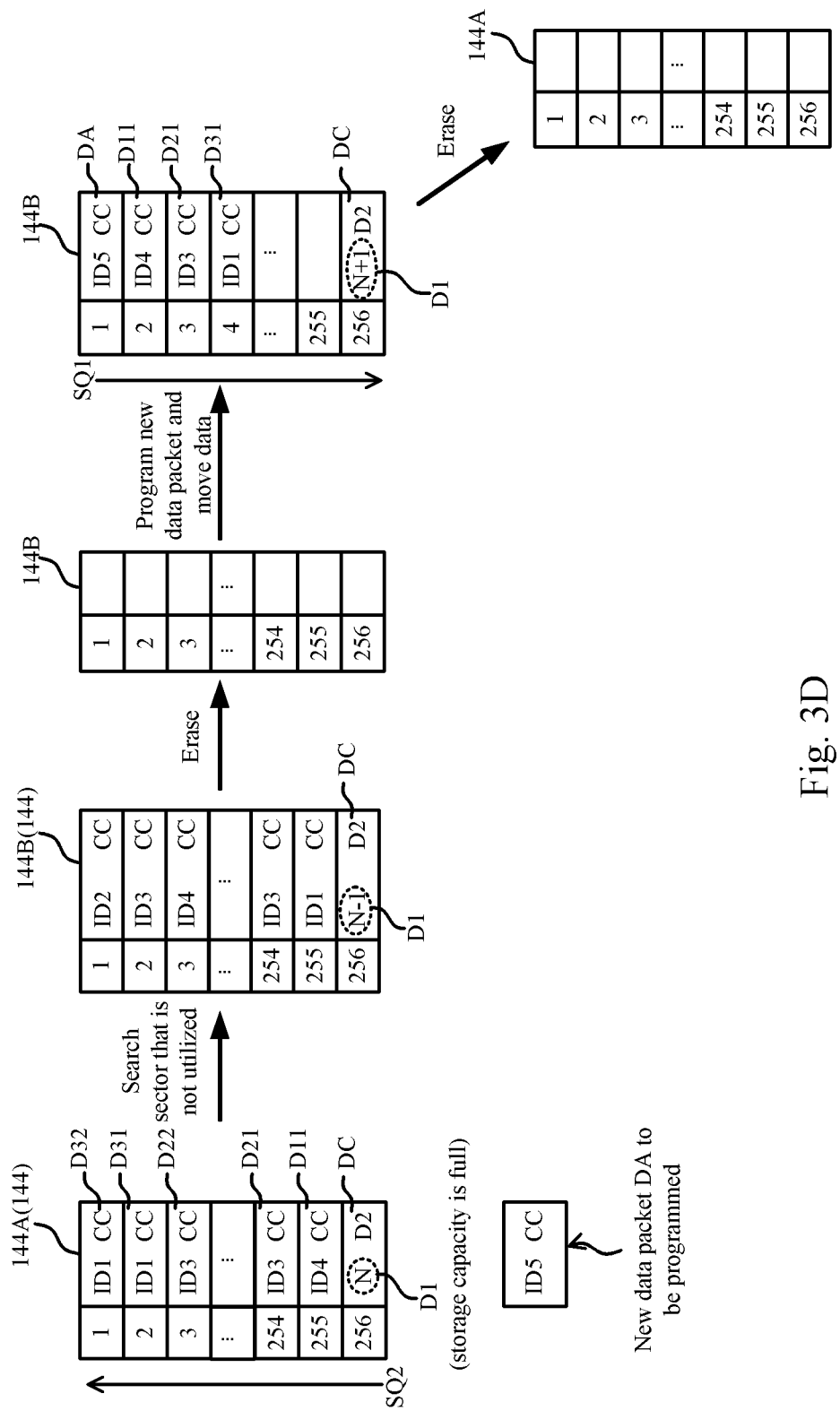

Reference is made to FIG. 3D. FIG. 3D is a schematic diagram of operation S206 in FIG. 2 according to some embodiments of the present disclosure. In some embodiments, each sector 144 stores one counter data DC which includes a value D1 and a check code D2. The value D1 is for indicating whether the sector 144 is a valid sector. The check code D2 is for verifying whether the value D1 is correctly programmed to the sector 144. In some embodiments, the controller circuit 120 reads the counter data DC of each sector 144, and selects the sector 144 that has the value D1 being an extreme value. In other words, the controller circuit 120 utilizes the sector 144 that has a maximum (or minimum) value D1 for subsequent operations with top priority. For example, the value D1 of the first sector 144 (hereinafter referred to as "the sector 144A") is N, and the value D1 of the second sector 144 (hereinafter referred to as "the sector 144B) is N−1. As N is greater than N−1, the controller circuit 120 utilizes the sector 144A for programming operation.

In this example, as the storage capacity of the sector 144A is full, the controller circuit 120 then selects the sector 144B for programming. The controller circuit 120 erases the sector 144B at first, in order to program the new data packet DA to the sector 144B in the address sequence SQ1. Afterwards, the controller circuit 120 reads the data packets stored in the sector 144A in the address sequence SQ2, and moves at least one of data packets (which is explained in later paragraphs) stored in the sector 144A to the sector 144B in the address sequence SQ1. The address sequence SQ2 is the inverse of the address sequence SQ1, in which the address sequence SQ2 is starting from the back address (256) to the front address (1).

If there are two or more data packets in the sector 144A have the same identity code, the controller circuit 120 moves a data packet that is read first in these data packets from the sector 144A to the sector 144B. For example, in the sector 144A, the data packet D21 and the data packet D22 have the same identity code ID3. In the address sequence SQ2, the data packet D21 is read first. Accordingly, the controller circuit 120 moves the data packet D21 to the sector 144B. In the address sequence SQ1, the data packet D21 is the new data packet programmed at the later time. Therefore, the controller circuit 120 keeps the newer data packet to the sector 144B with the above operations. Similarly, in the sector 144A, the data packet D31 and the data packet D32 have the same identity code ID1. As the data packet D31 is read first, the controller circuit 120 moves the data packet D31 to the sector 144B. As the address sequence SQ1 of programming data is the inverse of the address sequence SQ2 of reading data, the controller circuit 120 is able to move the new data packet having the same identity code to the sector 144B, and to discard the old data packet. In some other embodiments, the data programming method 200 may be performed with the address sequence SQ2, and a data reading method 400 in FIG. 4 may be performed with the address sequence SQ1.

In the sector 144A, if a data packet has a sole identity code, the controller circuit 120 moves this data packet from the sector 144A to the sector 144B. For example, in the sector 144A, only the data packet D11 has an identity code ID4. Accordingly, the controller circuit 120 moves the data packet D11 to the sector 144B.

In some embodiments, before moving data, the controller circuit 120 determines whether the data packets to be moved is correct according to the check codes CC of these data packets. On condition that the data packet is correct, the controller circuit 120 moves the data packet to another sector. In some embodiments, after the data moving operation is determined to be completed, the controller circuit 120 updates the counter data DC of the sector 144B, in order to update the value D1 of the sector 144B to be greater than the value D1 of the sector 144A. For example, as shown in FIG. 3D, the value D1 of the sector 144B is updated to be N+1. As a result, in the following reading operation or programming operation, the controller circuit 120 will utilize the sector 144B having the maximum value N+1. If the data moving operation has failed, the new counter data DC is not programmed to the erased sector 144B. As a result, the controller circuit 120 cannot read the sector 144B. Under this condition, in a next read operation, the controller circuit 120 still reads the sector 144A at first. If there is other data packets DA are going to be programmed, the controller circuit 120 executes operations in FIG. 3C again. In some embodiments, after the data moving operation is determined to be completed, the controller circuit 120 further erases the sector 144A, in order to release the storage space of the sector 144A.

With above configurations, the controller circuit 120 is able to program the new data packet DA to a storage space at a new address (which is a sector 144 in the above examples) in the flash memory 140, and to perform the erase operation when the storage space is required to be replaced. As a result, the number of times the flash memory 140 being erased can be significantly reduced, in order to improve the service life of the flash memory 140.

The examples shown in FIG. 3D are described by setting the extreme value of the value D1 as a maximum value, but the present disclosure is not limited thereto. In other embodiments, the extreme value of the value D1 can be set as a minimum value, and the operations of adjusting values can be adjusted correspondingly.

Figure 4:
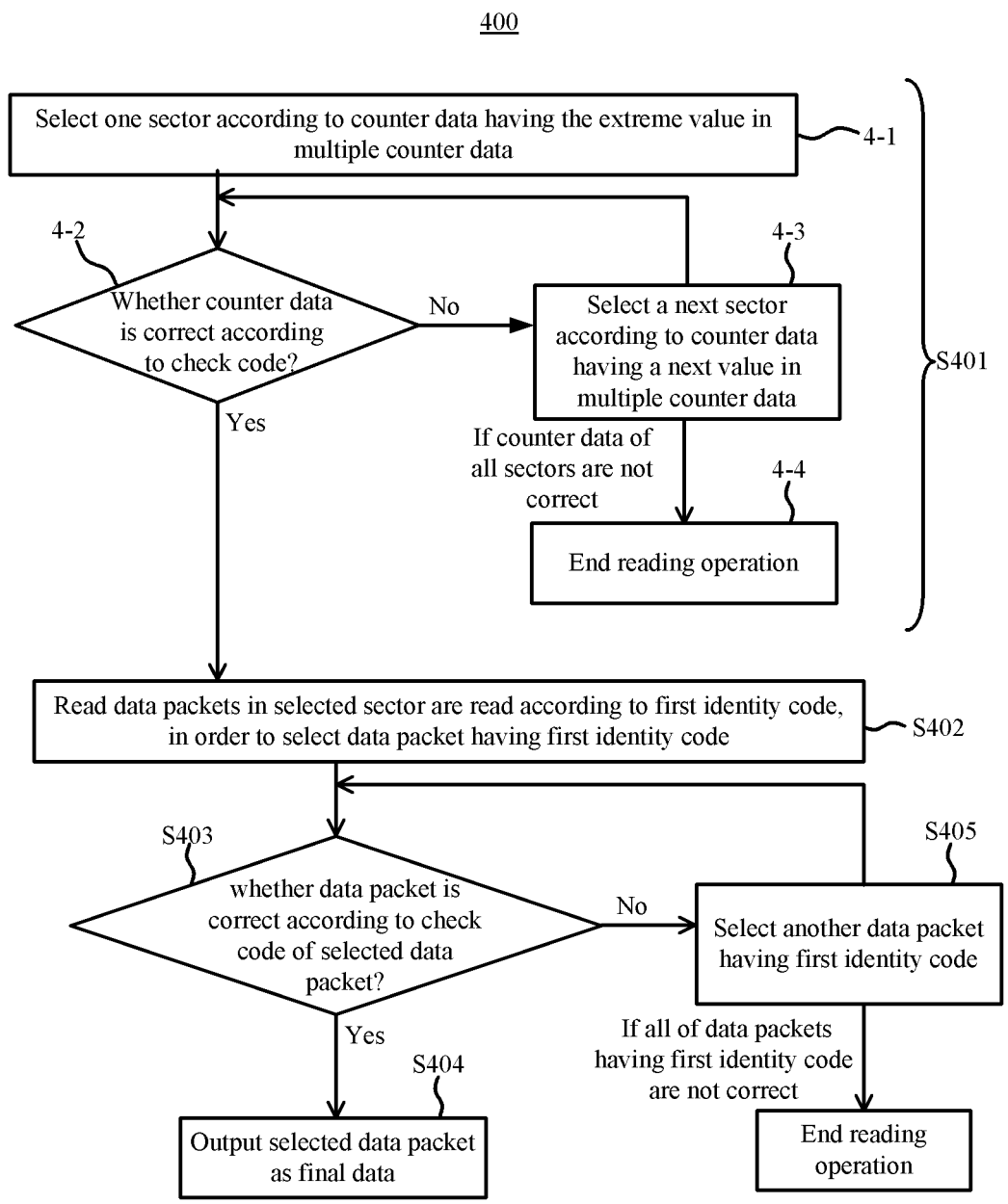
FIG. 4 is a flow chart of a data reading method according to some embodiments of the present disclosure.

FIG. 4 is a flow chart of a data reading method 400 according to some embodiments of the present disclosure. In some embodiments, the data reading method 400 may be performed by the controller circuit 120 in FIG. 1. In operation S401, a sector is selected from sectors according to multiple counter data stored in a flash memory.

Operation S401 includes steps 4-1, 4-2, 4-3, and 4-4. In step 4-1, one sector is selected according to counter data having the extreme value in the multiple counter data. In step 4-2, whether the counter data is correct is determined according to the check code. If the counter data is correct, operation S402 is performed. Alternatively, if the counter data is not correct, step 4-3 is performed. In step 4-3, a next sector is selected according to counter data having a next value in the multiple counter data, and step 4-2 is performed again. If counter data of all sectors are not correct, the controller circuit 120 ends the reading operation (i.e., step 4-4).

Figure 5A:
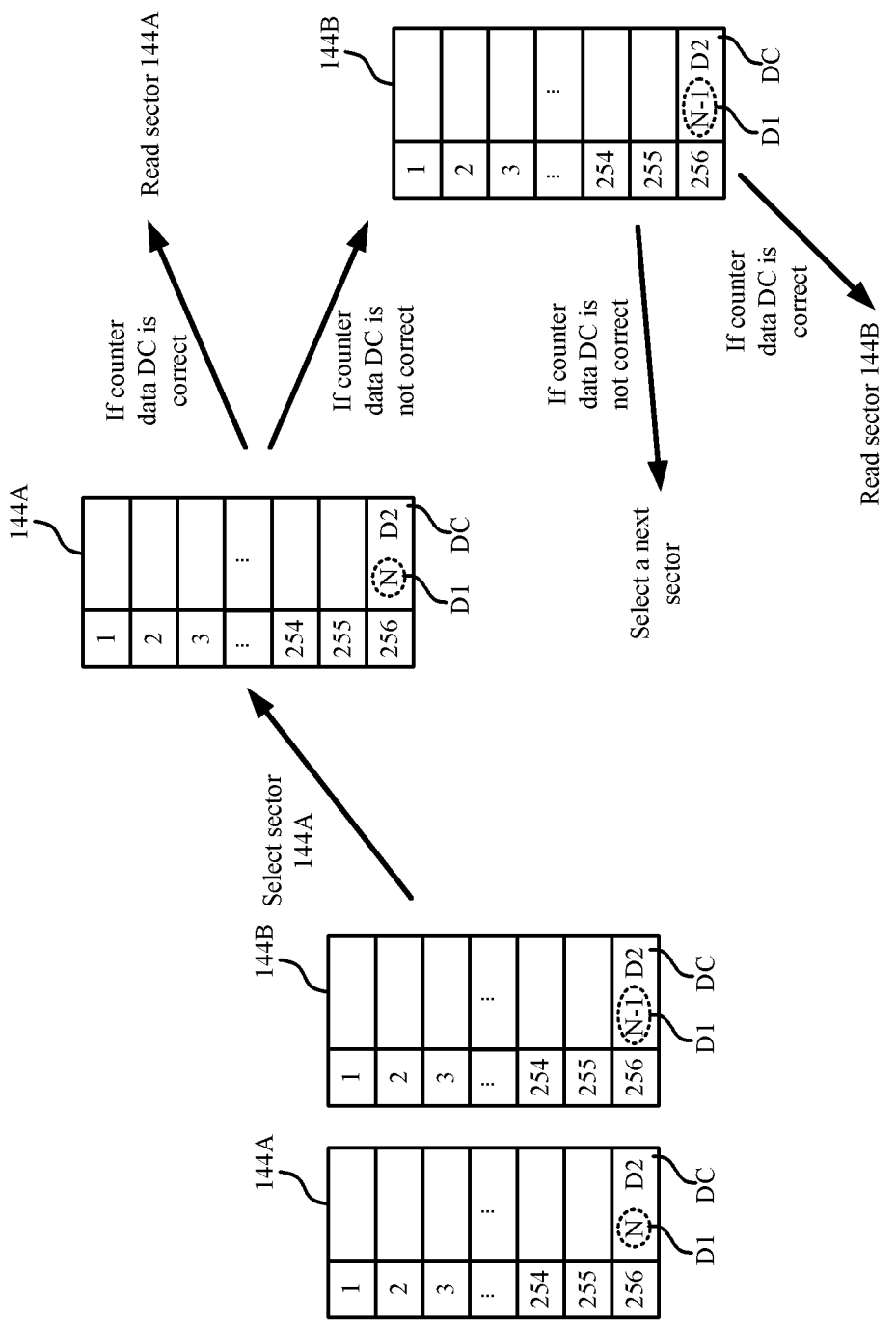
FIGS. 5A to 5B are schematic diagrams respectively illustrating operations in FIG. 4 according to some embodiments of the present disclosure.

Reference is made to FIG. 5A. FIG. 5A is a schematic diagram of operation S401 in FIG. 4 according to some embodiments of the present disclosure. In this example, the flash memory 140 includes the sector 144A and the sector 144B, and the extreme value is set to be the maximum value. The controller circuit 120 reads the counter data DC in the sector 144A and the counter data DC in the sector 144B. As the value of the counter data DC in the sector 144A is greater, the controller circuit 120 selects the sector 144A. Afterwards, the controller circuit 120 determines whether the counter data DC is correct according to the check code D2 of the counter data DC stored in the sector 144A. If the counter data DC of the sector 144A is correct, the controller circuit 120 utilizes the sector 144A for data reading.

If the counter data DC in the sector 144A is not correct, the controller circuit 120 re-selects the sector 144B. Afterwards, the controller circuit 120 determines whether the counter data DC in the sector 144B is correct according to the check code D2 of the counter data DC in the sector 144B. If the counter data DC in the sector 144B is correct, the controller circuit 120 utilizes the sector 144B for data reading. If the counter data DC of the sector 144B is not correct, the controller circuit 120 selects a next sector, and performs the above operations again. If the counter data in all sectors 144 are not correct, the controller circuit 120 ends the data reading operation.

With continued reference to FIG. 4, in operation S402, data packets in the selected sector are read according to a first identity code, in order to select a data packet having the first identity code. In operation S403, whether the data packet is correct is determined according to the check code of the selected data packet. If the data packet is correct, operation S404 is performed. If the data packet is not correct, operation S405 is performed. In operation S404, the selected data packet is outputted as final data. In operation S405, another data packet having the first identity code is selected, and operation S403 is performed again. If all data packets having the first identity code are not correct, the controller circuit 120 ends the data reading operation. Under this condition, the controller circuit 120 determines that the data reading operation is unsuccessful, and ends the data operation accordingly.

Figure 5B:
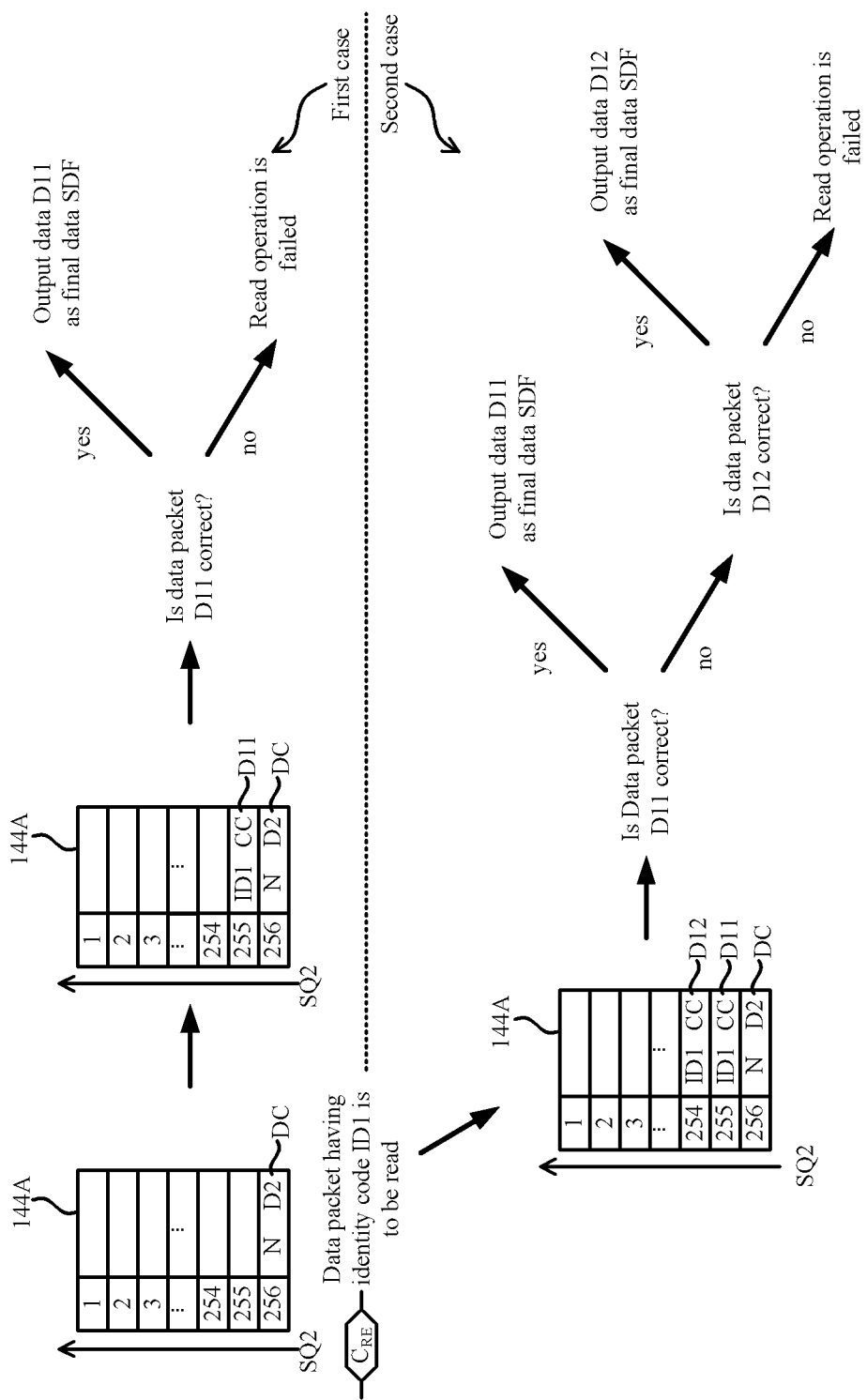

Reference is made to FIG. 5B. FIG. 5B is a schematic diagram of operations S402 to S405 according to some embodiments of the present disclosure. In response to the read command $C_{RE}$, the controller circuit 120 reads data stored in the selected sector (e.g., the sector 144A) in the second address sequence SQ2, in which the read command $C_{RE}$ indicates to read the data packet having the identity code ID1. In a first case, the sector 144A only stores one data packet D11 having the identity code ID1, and thus the controller circuit 120 determines whether the data packet D11 is correct according to the check code CC of the data packet D11. If the data packet D11 is correct, the controller circuit 120 outputs the data packet D11 as the final data SDF. Alternatively, if the data packet D11 is not correct, the controller circuit 120 determines that the flash memory 140 does not store the data required by the read command $C_{RE}$.

In a second case, the sector 144A stores two data packets D11 and D22 that have the identity code ID1. As the data packet D11 is the data packet to be read first, the controller circuit 120 determines whether the data packet D11 is correct according to the check code CC of the data packet D11. If the data packet D11 is correct, the controller circuit 120 outputs the data packet D11 as the final data SDF. Alternatively, if the data packet D11 is not correct, the controller circuit 120 determines whether the data packet D12 is correct according to the check code CC of the data packet D12. If the data packet D12 is correct, the controller circuit 120 outputs the data packet D12 as the final data SDF. If the data packet D12 is not correct, the controller circuit 120 determines that the flash memory 140 does not store the data required by the read command $C_{RE}$.

As described above, the memory device and the data programming/reading methods provided in some embodiments of the present disclosure are able to utilize the flash memory to simulate operations of EEPROM. As a result, a better balance can be achieved between the cost and the service life.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A data programming method, comprising:
   assigning a first identity code to initial data according to a data type of the initial data;
   packing the first identity code, the initial data, and a check code to a new data packet;
   determining whether a first storage space in a flash memory stores a first data packet being the same as the new data packet; and
   if the first storage space does not store the first data packet, programming the new data packet to the first storage space in a first address sequence.

2. The data programming method of claim 1, wherein if the first storage space does not store the first data packet, programming the new data packet to the first storage space in the first address sequence comprises:
   determining whether a storage capacity of the first storage space is full; and
   if the storage capacity of the first storage space is not full, programming the new data packet to the first storage space in the first address sequence.

3. The data programming method of claim 2, wherein if the storage capacity of the first storage space is full, the data programming method further comprises:
   programming the new data packet to a second storage space in the flash memory in the first address sequence; and
   reading a plurality of data packets from the first storage space according to a second address sequence, in order to move at least one of the plurality of data packets to the second storage space in the first address sequence, wherein the first address sequence is the inverse of the second address sequence.

4. The data programming method of claim 3, wherein reading the plurality of data packets from the first storage space in the second address sequence, in order to move at least one of the plurality of data packets to the second storage space in the first address sequence comprises:
    if an identity code of a second data packet in the plurality of data packets is the same as an identity code of a third data packet in the plurality of data packets, moving one of the second data packet and the third data pack that is read first from the first storage space to the second storage space; and
    if a fourth data packet in the plurality of data packets has a sole identity code, moving the fourth data packet from the first storage space to the second storage space.

5. The data programming method of claim 3, wherein the first storage space stores first counter data, the second storage space stores second counter data, a value of the first counter data is greater than a value of the second counter data before the plurality of data packets are read, and the data programming method further comprises:
    after the at least one of the plurality of data packets is moved, updating the value of the second counter data to be greater than the value of the first counter data.

6. The data programming method of claim 3, wherein the first storage space is a first sector in the flash memory, and the second storage space is a second sector in the flash memory.

7. The data programming method of claim 1, wherein determining whether the first storage space in the flash memory stores the first data packet being the same as the new data packet comprises:
    reading a plurality of data packets stored in the first storage space;
    comparing the first identity code with an identity code of each of the plurality of data packets, in order to select at least one data packet from the plurality of data packets, wherein the identity code of the at least one data packet is the same as the first identity code; and
    determining whether the at least data packet is the same as the new data packet, in order to determine whether the first storage space stores the first data packet.

8. The data programming method of claim 1, wherein the check code is for verifying whether the new data packet is correctly programmed to the first storage space.

9. A data reading method, comprising:
    selecting a first storage space from a plurality of storage spaces in a flash memory according to a plurality of counter data stored in the flash memory, wherein each of the plurality of storage spaces is configured to store a corresponding one of the plurality of counter data;
    reading a plurality of data packets in the first storage space according to a first identity code; and
    if at least one data packet in the plurality of data packets has the first identity code, outputting one data packet of the at least one data packet that is read first as final data.

10. The data reading method of claim 9, wherein selecting the first storage space from the plurality of storage spaces in the flash memory according to the plurality of counter data stored in the flash memory comprises:
    selecting the first storage space according to first counter data having an extreme value in the plurality of counter data, wherein the first storage space stores the first counter data;
    determining whether the first counter data is correct according to a check code of the first counter data; and
    if the first counter data is correct, reading the plurality of data packets in the first storage space.

11. The data reading method of claim 9, wherein the plurality of data packets are programmed to the first storage space in a first address sequence, and reading the plurality of data packets in the first storage space according to the first identity code comprises:
    reading the plurality of data packets from the first storage space in a second address sequence, wherein the first address sequence is the inverse of the second address sequence; and
    selecting the at least one data packet having the first identity code.

12. The data reading method of claim 9, wherein if the at least data packet comprises a first data packet and a second data packet, and outputting one data packet of the at least one data packet that is read first as final data comprises:
    if the second data packet is the one data packet being read first, determining whether the second data packet is correct according to a check code of the second data packet;
    if the second data packet is correct, outputting the second data packet as the final data; and
    if the second data is not correct, outputting the first data packet as the final data.

13. A memory device, comprising:
    a flash memory comprising a first storage space; and
    a controller circuit configured to:
        assign a first identity code to initial data according to a data type of the initial data;
        pack the first identity code, the initial data, and a check code to a new data packet;
        determine whether a first storage space in a flash memory stores a first data packet being the same as the new data packet; and
        if the first storage space does not store the first data packet, program the new data packet to the first storage space in a first address sequence.

14. The memory device of claim 13, wherein if the first storage space does not store the first data packet, the controller circuit is further configured to determine whether a storage capacity of the first storage space is full, and if the storage capacity of the first storage space is not full, the controller circuit is further configured to program the new data packet to the first storage space in the first address sequence.

15. The memory device of claim 14, wherein the flash memory further comprises a second storage space, and if the storage capacity of the first storage space is full, the controller circuit is further configured to program the new data packet to a second storage space in the flash memory in the first address sequence, and to read a plurality of data packets from the first storage space in a second address sequence, in order to move at least one of the plurality of data packets to the second storage space in the first address sequence, and the first address sequence is the inverse of the second address sequence.

16. The memory device of claim 15, wherein if an identity code of a second data packet in the plurality of data packets is the same as an identity code of a third data packet in the plurality of data packets, the controller circuit is configured to move one of the second data packet and the third data pack that is read first from the first storage space to the second storage space, and if a fourth data packet in the plurality of data packets has a sole identity code, the controller circuit is configured to move the fourth data packet from the first storage space to the second storage space.

17. The memory device of claim 15, wherein the first storage space stores first counter data, the second storage space stores second counter data, a value of the first counter data is greater than a value of the second counter data before the plurality of data packets are read, and after the at least one of the plurality of data packets is moved, the controller circuit is further configured to update the value of the second counter data to be greater than the value of the first counter data.

18. The memory device of claim 13, wherein the controller circuit is further configured to:
   select a first storage space from a plurality of storage spaces in the flash memory according to a plurality of counter data stored in the flash memory, wherein plurality of counter data are respectively stored in the plurality of storage spaces;
   read a plurality of data packets in the first storage space according to the first identity code; and
   if at least one data packet in the plurality of data packets has the first identity code, output one data packet of the at least one data packet that is read first as final data.

19. The memory device of claim 18, wherein the controller circuit is configured to:
   select the first storage space according to first counter data having an extreme value in the plurality of counter data, wherein the first storage space stores the first counter data;
   determine whether the first counter data is correct according to a check code of the first counter data; and
   read the plurality of data packets in the first storage space if the first counter data is correct.

20. The memory device of claim 18, wherein the controller circuit is configured to read the plurality of data packets from the first storage space in a second address sequence, and to select the at least one data packet having the first identity code, wherein the first address sequence is the inverse of the second address sequence.

* * * * *